(12) United States Patent
Zheng et al.

(10) Patent No.: US 6,319,036 B1
(45) Date of Patent: Nov. 20, 2001

(54) ELECTRICAL CARD CONNECTOR

(75) Inventors: Jian Qiang Zheng Zheng; Yun Tie Weng; Duan Zheng Xu, all of KunSan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/686,017

(22) Filed: Oct. 10, 2000

(30) Foreign Application Priority Data

Jun. 3, 2000 (TW) .............................................. 89209515 U

(51) Int. Cl.[7] .................................................... H01R 13/62
(52) U.S. Cl. .......................... 439/326; 439/331; 439/629
(58) Field of Search .................................. 439/331, 326, 439/327, 629, 639

(56) References Cited

U.S. PATENT DOCUMENTS

| | | | |
|---|---|---|---|
| 5,320,552 | * | 6/1994 | Reichardt et al. ..................... 439/331 |
| 5,603,629 | * | 2/1997 | DeFrasne et al. ..................... 439/331 |
| 5,984,707 | * | 11/1999 | Kuwata ................................. 439/326 |
| 5,996,891 | * | 12/1999 | Braun ..................................... 235/441 |
| 6,062,889 | * | 5/2000 | Hyland et al. ......................... 439/326 |
| 6,106,317 | * | 8/2000 | Michaelis et al. .................... 439/326 |
| 6,174,188 | * | 1/2001 | Martucci ............................... 439/326 |
| 6,210,193 | * | 4/2001 | Ito et al. ............................... 439/326 |
| 6,227,893 | * | 5/2001 | Kaneko ................................. 439/326 |

* cited by examiner

Primary Examiner—Renee Luebke
Assistant Examiner—Truc Nguyen
(74) Attorney, Agent, or Firm—Wei Te Chung

(57) ABSTRACT

An electrical card connector (1) includes a top lid (10) and a contact module (12). The top lid comprises a metal cover (100) and a pair of elongated grip arms (101) at opposite sides of the metal cover. Each grip arm is separately formed by insert molding at opposite sides of the cover and includes a rail (106) and a rib (107) projecting from a side of the rail. A pivot (108) is provided at a distal end of the rail and a wedge (109) extends from a forward end of the rail opposite the pivot. The contact module includes an insulative housing (120) and plurality of contacts (121). A pair of shaft lids (114) and a pair of lock portions (129) extend rearwardly and forwardly from rear and front corners of the insulative housing. Each shaft lid has a pivot hole (125) for pivotably engaging with a pivot of the grip arms. In use, an electrical card (2) is inserted into the top lid and the top lid is rotated to a closed position. The top lid is then pushed forward to a locked position where the wedges of the rails engage with the lock portions of the housing.

1 Claim, 6 Drawing Sheets

ELECTRICAL CARD CONNECTOR

FIELD OF THE INVENTION

The present invention relates to an electrical card connector used for mobile communications, and particularly to an electrical card connector for connecting an electrical card to a printed circuit board.

BACKGROUND OF THE INVENTION

Electrical card connectors are popularly used in mobile communications for connecting electrical cards to printed circuit boards Conventional electrical card connectors are disclosed in U.S Pat. Nos. 5,996,891, 5,984,707, 5,961,338, 5,603,629 and 5,320,552. Covers and bases of conventional electrical card connectors have a high profile to obtain a certain degree of strength. The high profile causes problems during injecting molding, such as uneven shrinkage.

To guarantee sufficient mechanical strength while obtaining a smaller profile, material having good mechanical strength and ability to flow as a liquid is required. However, this combination may still result in the appearance of defects caused by the liquid material failing to completely fill the mold.

Hence, an improved electrical card connector is needed to overcome the above-mentioned deficiencies of current electrical card connectors.

SUMMARY OF THE INVENTION

Accordingly, the primary object of the present invention is to provide an electrical card connector for use in mobile communications, particularly an electrical card connector with better mechanical strength and a smaller profile, and which has an improved shield.

An electrical card connector in accordance with the present invention comprises a top lid and a contact module. The top lid shields the contact module and has a metal cover and a pair of elongated grip arms. The metal cover and the grip arms are insert-molded into an integral unit. Each grip arm is separately formed at opposite sides of the cover and includes a rail and a rib projecting from a side of the rail. A pivot is provided at one end of the rail and is perpendicular to the rail, and a wedge extends from an opposite end of the rail. Additionally, the rib has a top face lower than a top face of the rail and cooperates with the side of the rail to hold an electrical card. The contact module includes an insulative housing and a plurality of contacts. Furthermore, a pair of shaft lids extends from two rearward corners of the housing while a pair of lock portions extends from two forward corners of the housing. Each shaft lid has a pivot hole for pivotably engaging with the pivots of the grip arms.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
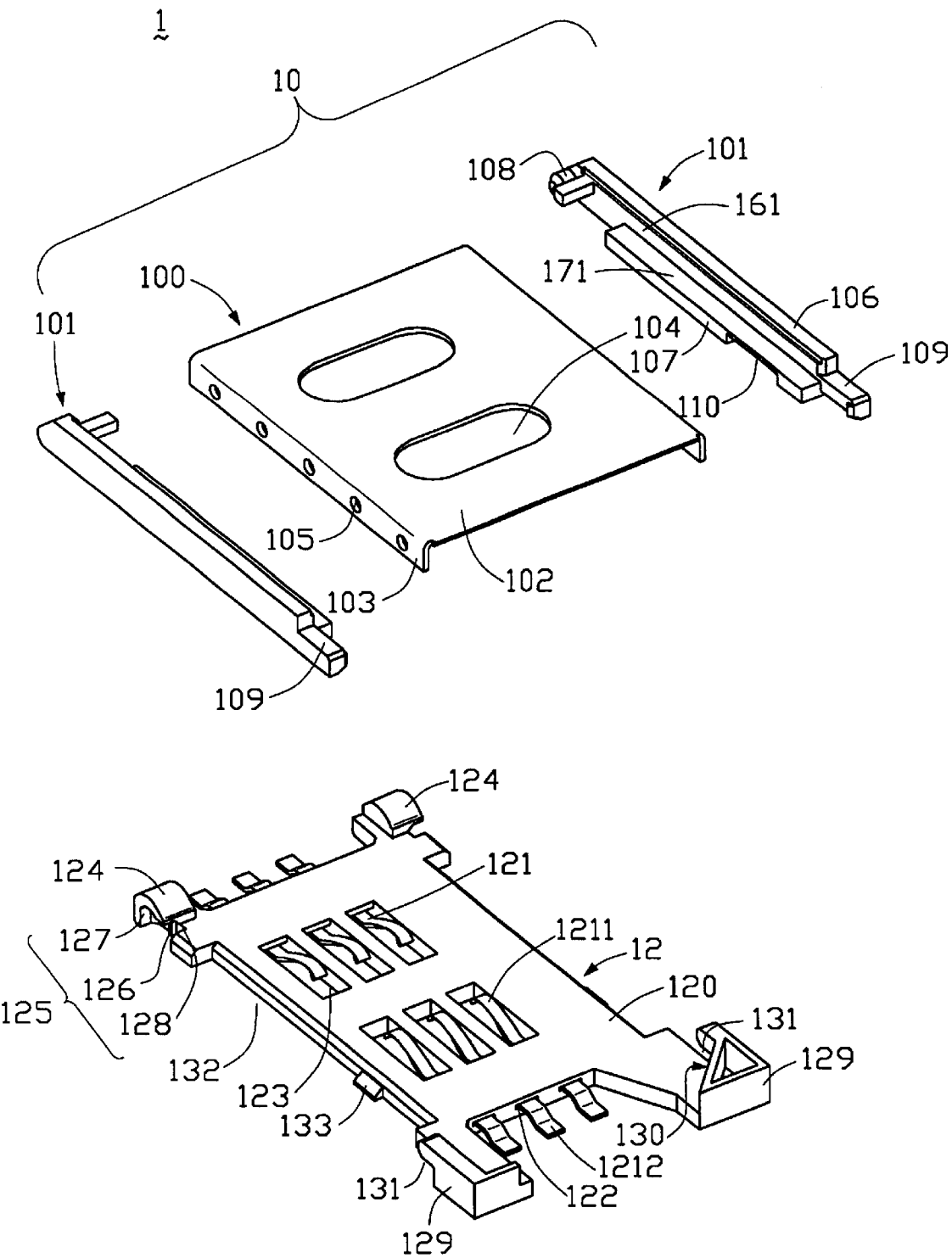
FIG. 1 is an exploded view of an electrical card connector in accordance with the present invention.
Figure 2:
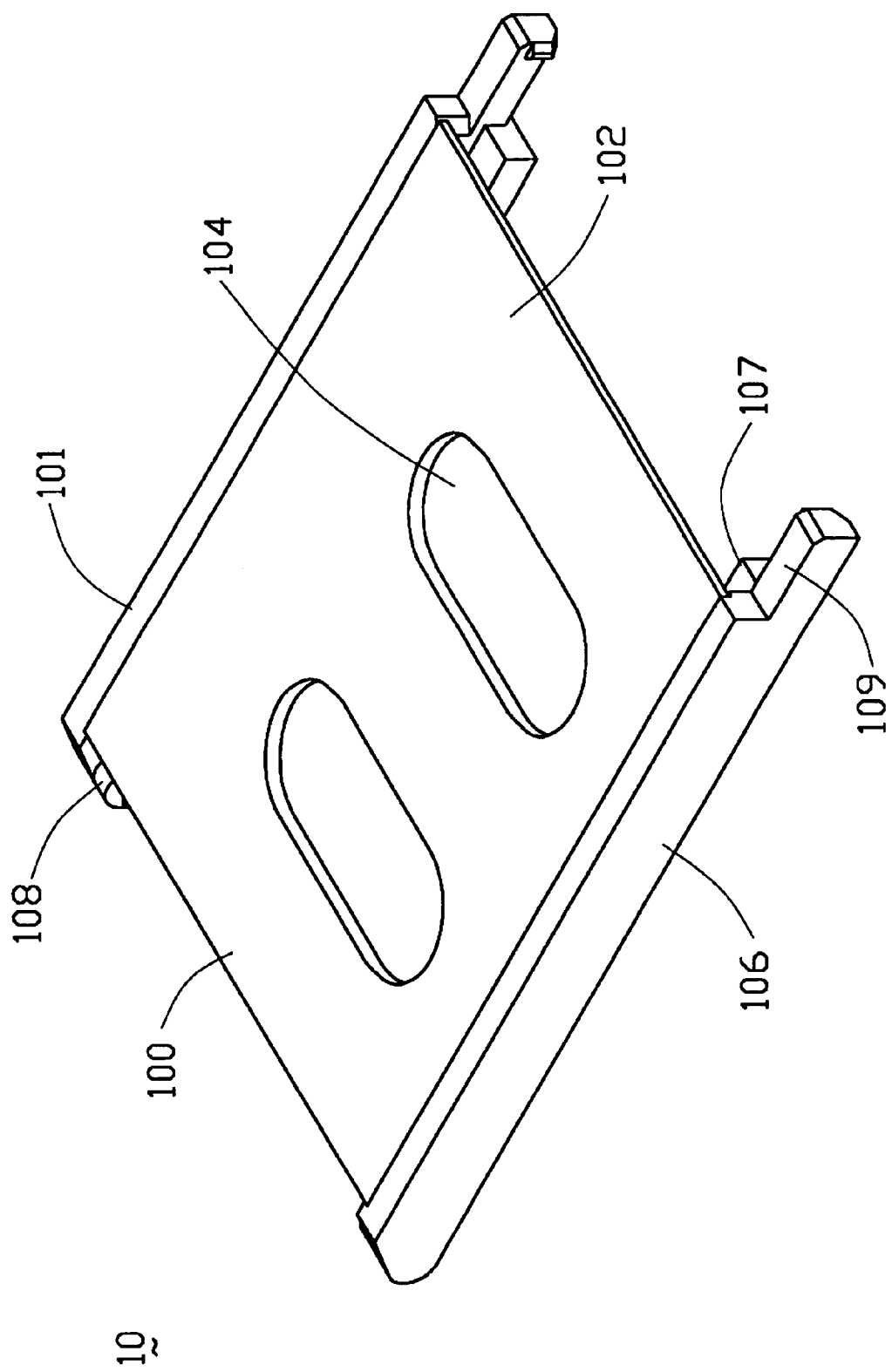
FIG. 2 is an assembled view of a top lid of FIG. 1.
Figure 3:
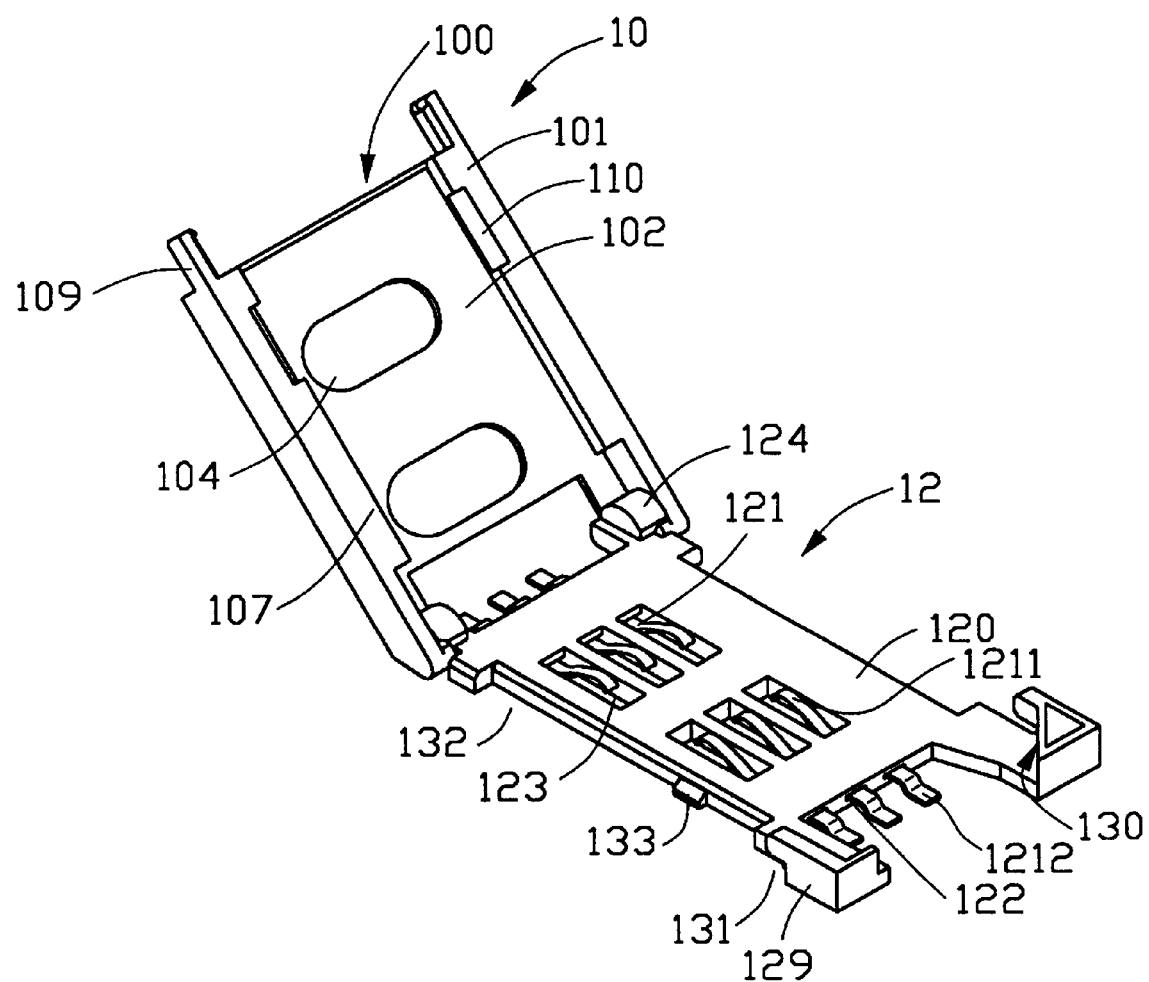
FIG. 3 is an assembled view of FIG. 1.

Referring to FIGS. 1–3, an electrical card connector 1 in accordance with the present invention comprises a contact module 12 and a top lid 10 for shielding the contact module 12.

Figure 4:
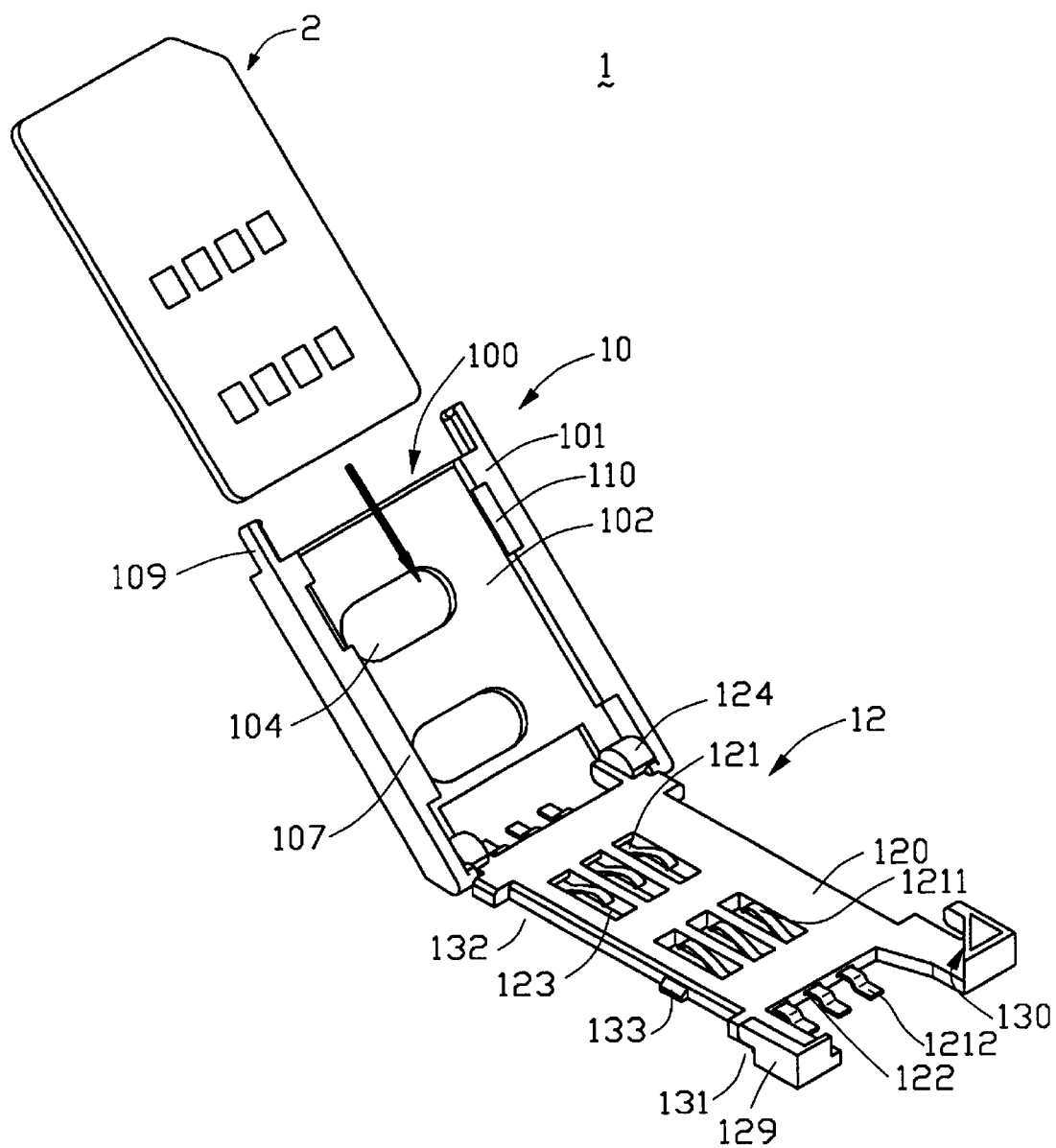
FIGS. 4–6 are perspective views of an electrical card being inserted into the electrical card connector at different stages of insertion.

The top lid 10 comprises a metal cover 100 and a pair of elongated grip arms 101 attached at both sides of the metal cover 100. The metal cover 100 includes a top wall 102 and a pair of lateral walls 103 downwardly depending from opposite edges of the top wall 102. The top wall 102 defines a plurality of openings 104 therein. A plurality of holes 105 is defined in the lateral walls 103 for enhancing engagement of the cover 100 with the grip arms 101. Each grip arm 101 is separately formed by injection molding to the metal cover 100 and includes a rail 106 and a rib 107 projecting from a side 161 of the rail 106. Each rail 106 forms a pivot 108 at a rearward end thereof, the pivot 108 being perpendicular to the rail 106 (as shown in FIG. 1). A wedge 109 extends from a forward end of each rail 106 opposite the corresponding pivot 108. The rib 107 has a top face 171 which is lower than a top face (not labeled) of the rail 106 and which cooperates with the side 161 to hold an electrical card 2 (as shown in FIG. 4). A slide channel 110 is defined in a bottom of the rib 107.

The contact module 12 includes an insulative housing 120 defining a plurality of contact passageways 122 in opposite ends thereof and a plurality of contacts 121 received in the passageways 122. The insulative housing 120 defines a plurality of apertures 123 therethrough arranged in two parallel rows. Each aperture communicates with a corresponding passageway 122. A pair of shaft lids 124 extends upwardly from opposite rear corners of the insulative housing 120. Each shaft lid 124 defines a pivot hole 125 for pivotably engaging with the pivot 108 of a corresponding grip arm 101. An embossment 126 is formed in a middle of the pivot hole 125 defining a first pivot hole 127 and a second pivot hole 128. A pair of L-shaped lock portions 129 are formed on opposite front corners of the insulative housing 120. Each lock portion 129 defines a recess 131 in a lower rear portion thereof for receiving the wedge 109 of a corresponding grip arm 101. One lock portion 129 further forms a wall 130 connecting with two sides thereof for abutting against a corner (unlabeled) of the electrical card 2. The insulative housing 120 has a pair of notches 132 in opposite sides thereof, corresponding to the ribs 107 of the grip arms 101. A pair of lugs 133 projects outwardly from sides of the notches 132 for slidably engaging with the slide channels 1 10 of the grip arms 101.

The contacts 121 each include a contact portion 1211 and a soldering portion 1212. The contact portions 1211 are received in and project beyond corresponding apertures 123. The soldering portions 1212 project from corresponding contact passageways 122.

During insert-molding, the metal cover 100 and the grip arms 101 are integrally molded into one unit. The holes 105 of the metal cover 100 are injected with molten plastic to securely engage the cover 100 with the grip arm 101. Then the pivot holes 125 of the contact module 12 and the pivots 108 of the grip arms 101 are pivotably assembled together.

Figure 5:
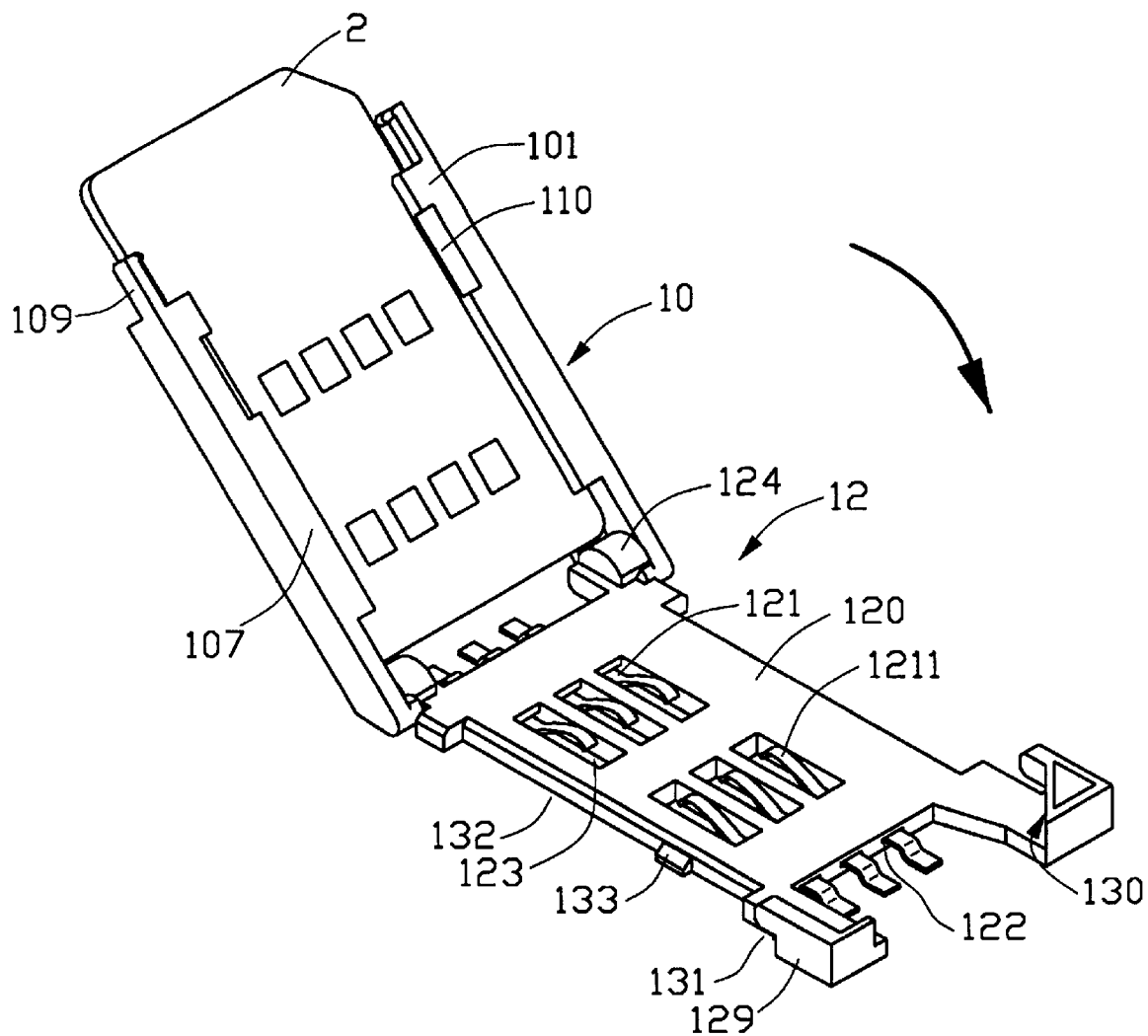
Figure 6:
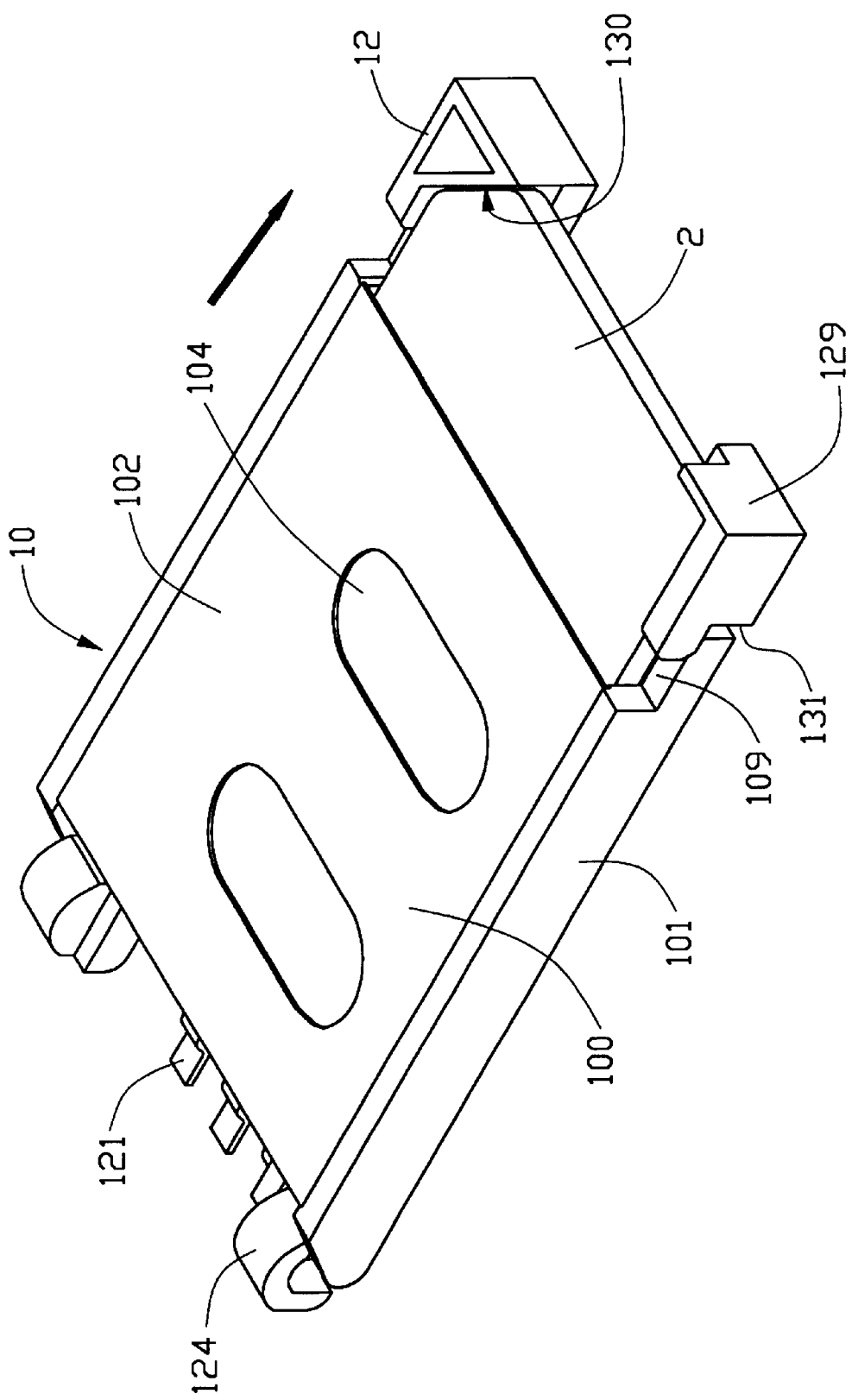

Referring to FIG. 4, in use, the electrical card 2 is inserted into the top lid 10 of the electrical card connector 1. Referring to FIG. 5, the top lid 10 rotates toward the contact module 12 to a closed position. Referring to FIG. 6, at the closed position, the rib 107 of the rail 106 is received in the notch 132 of the insulative housing 120. The lug 133 is slidably received in the slide channel 110, close to a front end thereof The wedges 109 of the rails 106 are not yet engaged with the recesses 131 of the locked portions 129 of the contact module 12. The pivots 108 are accommodated in the first pivot holes 127. Finally, to lock the top lid 10 to the contact module 12 in the locked position, the top lid 10 is pushed in the direction of the thick arrow shown in FIG. 6. The pivots 108 move over the embossments 126 from the first pivot holes 127 into the second pivot holes 128 and abut against a forward side of the embossment 126. The lugs 133 moved toward a rear end of the slide channels 110. The wedges 109 of the rails 106 engage with the corresponding recesses 131 of the lock portions 129.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

What is claimed is:

1. An electrical connector for connection with an electrical card accomodated therein, comprising:

a contact module including an insulative housing and a plurality of contacts received in the housing; and a top lid including a metal cover and at least a pair of separately formed fastening means secured to opposite sides of the top cover for pivotally engaging with the contact module;

wherein each fastening means comprises an elongated grip arm, the grip arm including a rail and a rib projecting for a side of the rails;

wherein a pivot is provided at a rearward end of the rail and is perpendicular to the rail, and a wedge extends from a forward end of the rail opposite the pivot;

wherein a pair of shaft lids extends rearwardly from rear corners of the insulative housing, and a pair of lock portions extends forwardly from forward opposite corners of the insulative housing;

wherein each of said shaft lids defines a pivot hole for pivotably engaging with the pivots of the grip arms and forms an embossment in a middle of each pivots hole;

wherein each said pivot hole includes a first pivot hole and a second pivot hole separated by a said embossment;

wherein each of said lock portion defines a recess in a lower portion thereof for receiving the wedge of said corresponding grip arm;

wherein said lock portions further have an L-shaped, and at least one of said lock portion further forms a wall connecting with two sides of the L-shaped lock portion for abutting against a corner of the electrical card;

wherein said rib has a top face which is below a top face of the rail and which cooperates with the side of the rail to hold the electrical card;

wherein the insulative housing defines a pair of notches in opposite sides thereof and forms a pair of lugs in said pair of notches;

wherein said rib of each rail is received in said corresponding notch of said insulative housing;

wherein said metal cover includes a top wall and a pair of lateral walls downwardly depending from opposite edges of the top wall;

wherein the metal cover and said fastening means are integrally formed together.

* * * * *